(12) United States Patent
Roderick et al.

(10) Patent No.: US 11,090,612 B2
(45) Date of Patent: Aug. 17, 2021

(54) GRADED SPACERS FOR FILTRATION WOUND ELEMENTS

(71) Applicant: Aqua Membranes LLC, Albuquerque, NM (US)

(72) Inventors: Kevin Roderick, Albuquerque, NM (US); Rodney Herrington, Albuquerque, NM (US)

(73) Assignee: Aqua Membranes Inc., Albuquerque, NM (US)

( * ) Notice: Subject to any disclaimer, the term of this patent is extended or adjusted under 35 U.S.C. 154(b) by 0 days.

(21) Appl. No.: 16/072,852

(22) PCT Filed: Jan. 31, 2018

(86) PCT No.: PCT/US2018/016318
§ 371 (c)(1),
(2) Date: Jul. 25, 2018

(87) PCT Pub. No.: WO2018/190937
PCT Pub. Date: Oct. 18, 2018

(65) Prior Publication Data
US 2020/0376439 A1    Dec. 3, 2020

Related U.S. Application Data

(60) Provisional application No. 62/484,562, filed on Apr. 12, 2017.

(51) Int. Cl.
*B01D 63/10* (2006.01)
*C02F 1/44* (2006.01)
*B01D 63/12* (2006.01)

(52) U.S. Cl.
CPC .......... *B01D 63/103* (2013.01); *C02F 1/441* (2013.01); *B01D 63/12* (2013.01); *B01D 2313/04* (2013.01); *B01D 2313/143* (2013.01); *B01D 2313/146* (2013.01)

(58) Field of Classification Search
CPC ............. B01D 63/103; B01D 2313/04; B01D 2313/143; B01D 63/12; B01D 61/00; B01D 63/00; B01D 63/10; C02F 1/441
See application file for complete search history.

(56) References Cited

U.S. PATENT DOCUMENTS

| | | |
|---|---|---|
| 3,963,621 A | 6/1976 | Newman |
| 4,187,173 A | 2/1980 | Keefer |
| 4,208,289 A | 6/1980 | Bray |
| 4,222,874 A | 9/1980 | Connelly |
| 4,228,014 A | 10/1980 | Timm et al. |

(Continued)

FOREIGN PATENT DOCUMENTS

| | | |
|---|---|---|
| CA | 2662925 A1 | 1/2009 |
| CA | 2825674 C | 8/2011 |

(Continued)

*Primary Examiner* — Bradley R Spies
*Assistant Examiner* — Jeannie McDermott
(74) *Attorney, Agent, or Firm* — V Gerald Grafe

(57) ABSTRACT

Embodiments of the present invention provide elements that are beneficial for use in fluid filtration. Embodiments provide elements that have variable feed spacer height, variable permeate spacer height, or both. The variable height allows flow properties to be matched to fluid volume as the filtration occurs.

7 Claims, 3 Drawing Sheets

(56) References Cited

U.S. PATENT DOCUMENTS

| | | |
|---|---|---|
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,765,893 A * | 8/1988 | Kohlheb .............. B01D 63/103 210/315 |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |
| 4,842,736 A | 6/1989 | Bray |
| 4,844,805 A | 7/1989 | Solomon |
| 4,855,058 A | 8/1989 | Holland et al. |
| 4,856,559 A | 8/1989 | Lipshultz et al. |
| 4,869,821 A | 9/1989 | Korin |
| 4,874,514 A | 10/1989 | Casey Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,096,584 A * | 3/1992 | Reddy .................... B01D 53/22 210/321.74 |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,375,014 B1 * | 4/2002 | Garcera .............. B01D 63/066 210/490 |
| 6,379,518 B1 | 4/2002 | Osawa et al. |
| 6,379,548 B1 | 4/2002 | Kurokawa et al. |

(56) References Cited

U.S. PATENT DOCUMENTS

| | | |
|---|---|---|
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2008/0290031 A1 | 11/2008 | Popa |
| 2009/0025553 A1 | 1/2009 | Keefer |
| 2012/0298578 A1 | 11/2012 | Herrington |
| 2013/0334128 A1 | 12/2013 | Takagi et al. |
| 2016/0008763 A1* | 1/2016 | Roderick ............ B01D 63/106 210/650 |
| 2016/0059188 A1* | 3/2016 | Liberman ............ B01D 61/08 417/53 |
| 2016/0236132 A1 | 8/2016 | Hara et al. |

FOREIGN PATENT DOCUMENTS

| | | |
|---|---|---|
| EP | 2902094 | 8/2015 |
| WO | WO2010047360 A1 | 4/2010 |
| WO | WO2015016253 A1 | 2/2015 |
| WO | WO2002/055179 | 8/2015 |
| WO | WO2016199272 A1 | 12/2016 |
| WO | WO2017087461 A1 | 5/2017 |

* cited by examiner

GRADED SPACERS FOR FILTRATION WOUND ELEMENTS

TECHNICAL FIELD

The subject invention relates to a membrane or filtration system utilized for the separation of fluid components, specifically spiral-wound membrane elements and flat membrane elements.

BACKGROUND

Spiral-wound membrane filtration elements generally consist of a laminated structure comprised of a membrane sheet sealed to or around a porous permeate carrier which creates a path for removal, longitudinally to the axis of the center tube, of the fluid passing through the membrane to a central tube, while this laminated structure is wrapped spirally around the central tube and spaced from itself with a porous feed spacer to allow axial flow of the fluid through the element. Traditionally, a feed spacer is used to allow flow of the feed water, some portion of which will pass through the membrane, into the spiral wound element and allow reject water to exit the element in a direction parallel to the center tube and axial to the element construction.

An alternate design of a spiral wound element allows for the feed to reject stream to flow in the same longitudinal direction of the spiral would membrane as the permeate flow, either from the outside of the spiral to the center, or from the inside of the spiral to the outside. Such a design requires a specially modified divided center tube to allow two separate flow paths, and also requires that both axial ends of the element are fully sealed to create the longitudinal flow path. This design of a spiral would element can be advantageous in providing an increased flow velocity and fluid shear within the feed to reject stream when compared to the traditional cross-flow design. Increased flow velocity can be beneficial for the prevention of organic and inorganic fouling of the membrane and feed spacer, as well as reducing concentration polarization within the element as liquid passes through the membrane. Examples of such elements are those manufactured by Pentair Corporation under the trade name GRO.

It is also a source of flow restriction and pressure drop within the axial flow channel and also presents areas of restriction of flow and contact to the membrane that contribute significantly to membrane fouling via biological growth, scale formation, and particle capture.

SUMMARY

Embodiments of the present invention provide elements that are beneficial for use in fluid filtration. Embodiments provide elements that have variable feed spacer height, variable permeate spacer height, or both. The variable height allows flow properties to be matched to fluid volume as the filtration occurs.

DESCRIPTION OF EMBODIMENTS AND INDUSTRIAL APPLICABILITY

Improvements to the design of spiral wound elements have been disclosed in U.S. Pat. No. 6,632,357 to Barger et al., U.S. Pat. No. 7,311,831 to Bradford et al., and patent application PCT/US14/18813 to Herrington et al. which replaces the feed spacer with islands or protrusions either deposited or embossed directly onto the inside or outside surface of the membrane. None of these patents or applications, however, teaches a graded feed spacer or permeate carrier pattern height perpendicular to the axis of the center tube. The inventors have discovered that this configuration can be advantageous in that it maintains spacing for axial flow through the element while minimizing obstruction within the flow channel. In a brine feed spacer, concentration polarization increases at the reject end of the feed space as water molecules go through the membrane and reject salt ions. By having a thinner feed channel height at the reject end of the feed space, fluid shear is increased, thereby reducing the negative effects of concentration polarization. A printed or deposited spacer also eliminates the porous brine feed spacer as a separate component, thus simplifying element manufacture. On the permeate side of the membrane, as more and more water passes through the membrane, the volume of water flow increases as the water approaches the center tube. By gradually increasing the height of the space in the permeate flow region as fluid approaches the center tube, more volume (or cross section) is available in the space to minimize fluid velocity and subsequently reduce back pressure in the permeate space.

Due to the nature of membrane filtration, the inlet flow volume is continuously reduced while it flows across the membrane, and the permeate flow volume increases down the length of the permeate carrier. The reject flow volume represents the difference between the inlet flow and the permeate flow, and comprises the full content of the dissolved or suspended materials which are not able to flow through the membrane, and are thus at a higher concentration in the reject stream than the inlet feed stream.

Figure 1:
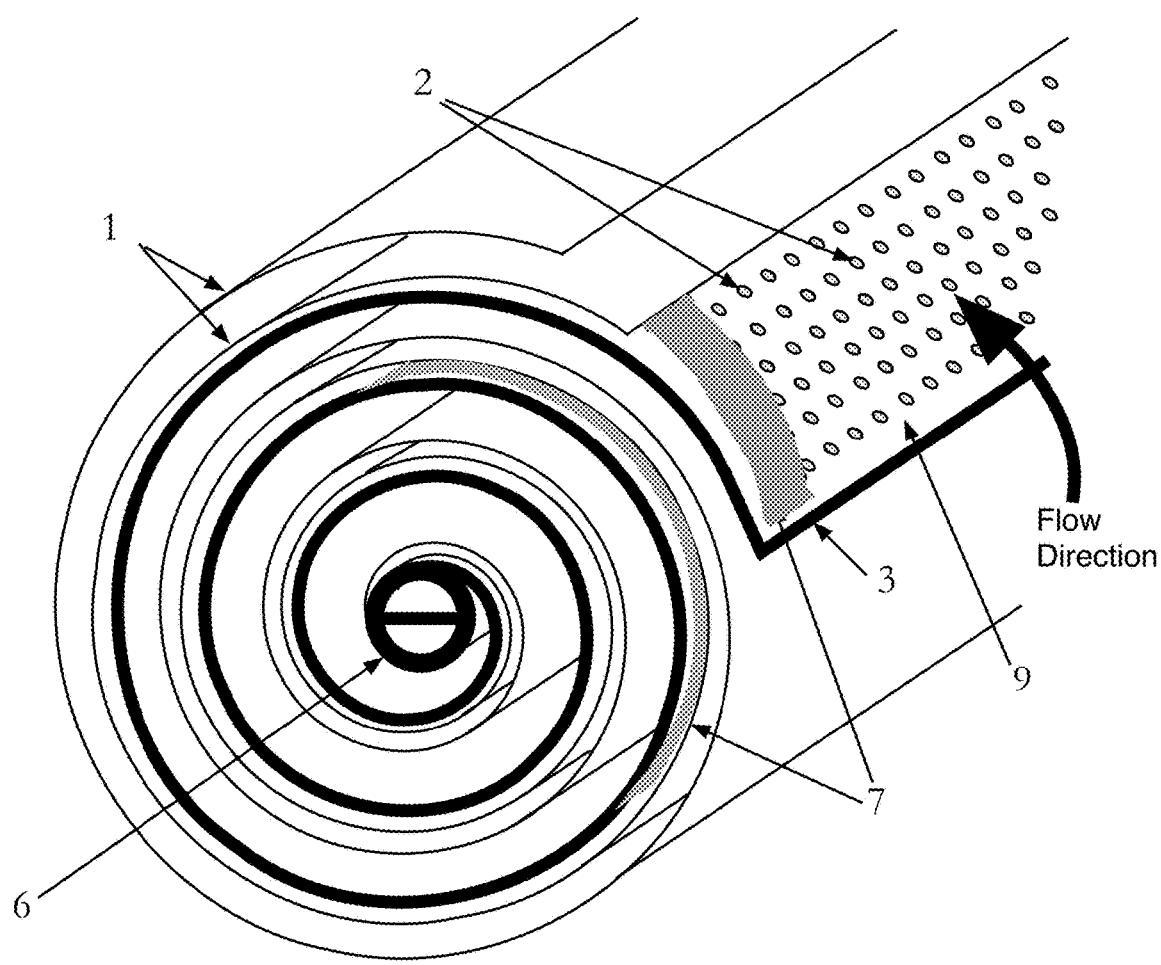
FIG. 1 is a schematic illustration of a longitudinal flow spiral wound element.
Figure 2:
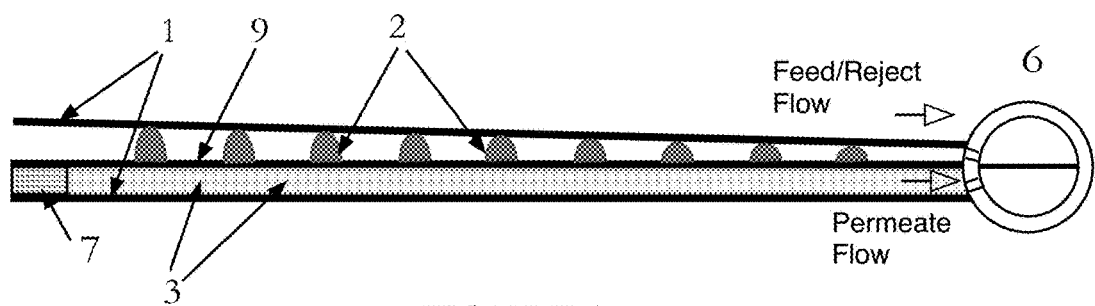
FIG. 2 is a longitudinal cross section illustration of an unrolled longitudinal flow element with height graded deposited feed spacer.

The present invention provides a gradation in the brine feed spacing height in longitudinal flow spiral wound elements such that the height of the brine feed spacing decreases from the flow stream to the reject stream, allowing for more consistent or increased flow velocity as the volumetric flow through the feed to reject stream is reduced due to flow across the membrane. FIG. 1 depicts a longitudinal flow spiral wound element comprising one layer of membrane sheet 1, graded height feed spacer features 2 deposited on a second layer of membrane sheet 9 with a fixed height permeate carrier 3. The direction of feed flow and permeate flow are concurrent inward from the outer edge. The height of the feed spacer decreases from the point most distant from the center tube 6 to the point closest to it. The reject flow and permeate flow are collected through separate openings in a divided center tube 6. Glue lines 7 seal the edges of the element and produce longitudinal feed to reject flow within the element. FIG. 2 shows the same element in an unwound configuration so that the height gradation in the feed spacer features 2 can be seen more clearly. In the remainder of the drawings, membrane sheet 1 is depicted above and below in the diagram to visually represent the flow paths of the feed and permeate streams, but in use is only a single membrane sheet which creates the $2^{nd}$ flow channel when the spiral-wound element is rolled. As the brine flows from the feed end toward the reject stream at the center tube, volumetric flow in the feed channel is reduced as water passes through the membrane to the permeate carrier. Decreasing the height of the feed spacer allows for constant or increased flow velocity in the feed stream as the volumetric flow decreases, which can be advantageous in preventing scale formation in the element. Likewise, by decreasing the height of the feed spacer along its length, overall leaf length can be increased while keeping the element diameter constant, allowing for additional surface area within the element.

Figure 3:
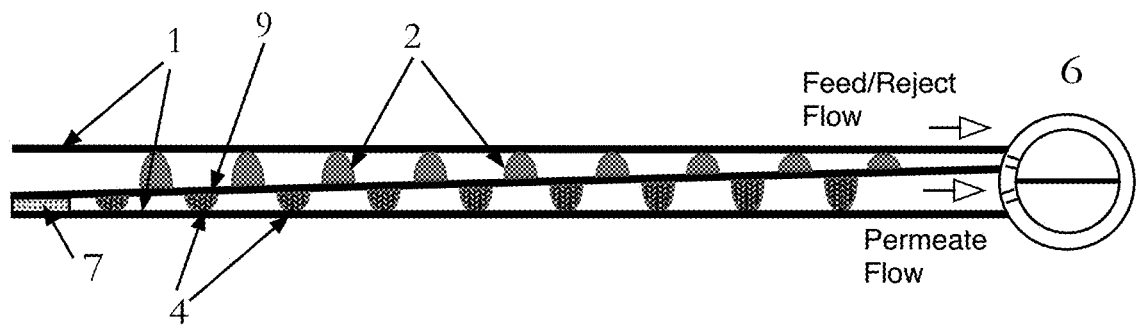
FIG. 3 is a longitudinal cross section illustration of an unrolled longitudinal flow element with height graded deposited feed spacer and height graded deposited permeate carrier.

Similarly the height of the permeate carrier can be decreased at the longitudinal end of the element most distant from the center tube, where the volumetric flow is at its minimum, and increased as the volumetric flow increases towards the center tube. The height of the brine feed spacer can be increased at the longitudinal end of the element most distant from the center tube while the permeate carrier height is decreased commensurately so that the overall thickness of the feed spacer, membrane sheet, and permeate carrier are a constant thickness throughout the assembly. The heights can also be varied to achieve an increasing or decreasing overall thickness if desired. The variable height of both of these spacers can be achieved, as examples, by layering conventionally utilized mesh spacers of various heights or by depositing features on the membrane sheet whose height varies longitudinally directly onto one or both sides of the membrane sheet before element assembly. FIG. 3, depicts an unrolled longitudinal flow element with a deposited variable height feed spacer 2 which decreases in height from feed to reject flow between membrane sheets 1, 9. A height graded deposited permeate carrier 4 increases in height from the end most distant from the divided center tube 6 to the attachment to the divided center tube 6; in the example shown the increase in height matches the decrease in height of the feed spacer. The permeate carrier is bounded on 3 sides by glue lines 7, while the feed spacer is bounded only on the outer edges. The direction of feed flow and permeate flow are concurrent inward from the outer edge to the divided center tube 6. The combination of decreasing feed height and increasing permeate height optimizes the overall volume of the element, maintaining more constant longitudinal volumetric flow throughout both the feed spacer and the permeate carrier.

In traditional axial brine feed flow and in longitudinal flow elements, another example embodiment of the present invention employs a gradation in the height of only the permeate carrier, increasing in thickness longitudinally from the point most distant from the center tube to the point adjacent the center tube. An example industry standard permeate carrier can be 0.010" in height throughout its length. By providing a permeate carrier which is thinner, for example 0.002" at the edge most distant from the center tube, increasing in height to 0.010" at the edge closest to the center tube, the length of the envelope comprising the membrane sheet and permeate carrier can be increased, providing additional surface area for filtration, while maintaining a constant volume of the element overall. The variable height of this spacer can be achieved, as examples, by layering conventionally utilized mesh spacers of various heights or by depositing features on the membrane sheet whose height varies radially directly onto one side of the membrane sheet before element assembly. In axial flow elements multiple leaves can be used, with each permeate carrier comprising a graded height spacer.

Figure 4:
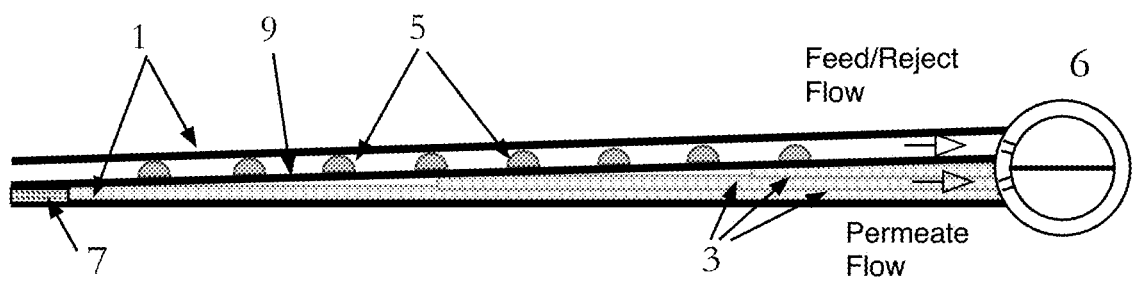
FIG. 4 is a longitudinal cross section illustration of an unrolled longitudinal flow element with deposited fixed height feed spacer and a height graded mesh permeate carrier.

FIG. 4 shows an embodiment of an unrolled longitudinal flow element with deposited fixed height feed spacer 5 between membrane sheets 1, 9. A height graded mesh permeate carrier 3, created from three separate sheets of thin mesh, increases in height from the end most distant from the divided center tube 6 to the attachment to the divided center tube 6 bounded, by glue lines 7. The direction of feed flow and permeate flow are concurrent inward from the outer edge to the divided center tube 6. In this embodiment, as well as those shown in FIG. 5-FIG. 7, the reduced thickness of permeate carrier at distal end enables longer leaf length in a given diameter element due to reduced overall permeate carrier volume, while maintaining sufficient cross sectional area for adequate permeate flow throughout.

Figure 5:
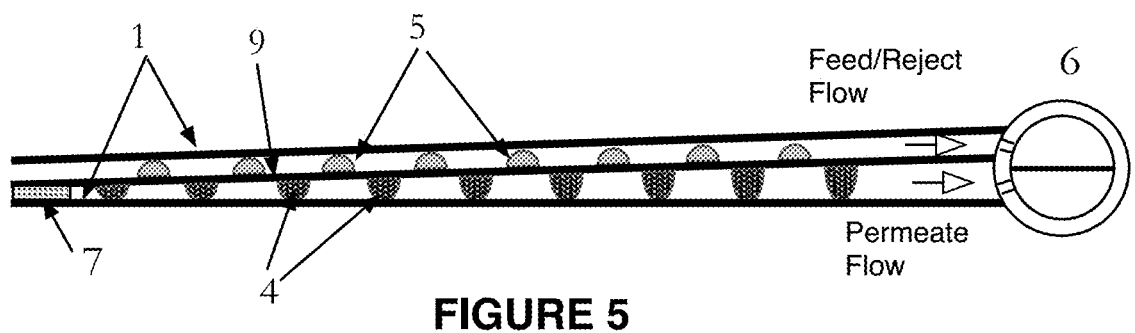
FIG. 5 is a longitudinal cross section illustration of an unrolled longitudinal flow element with deposited fixed height feed spacer and a height graded deposited permeate carrier.

FIG. 5 depicts a further embodiment of an unrolled longitudinal flow element with deposited fixed height feed spacer 5 between membrane sheets 1, 9. Here, a height graded deposited permeate carrier 4 increases in height from the end most distant from the divided center tube 6 to the attachment to the divided center tube 6, bounded by glue lines 7. The direction of feed flow and permeate flow are concurrent inward from the outer edge to the divided center tube 6.

Figure 6:
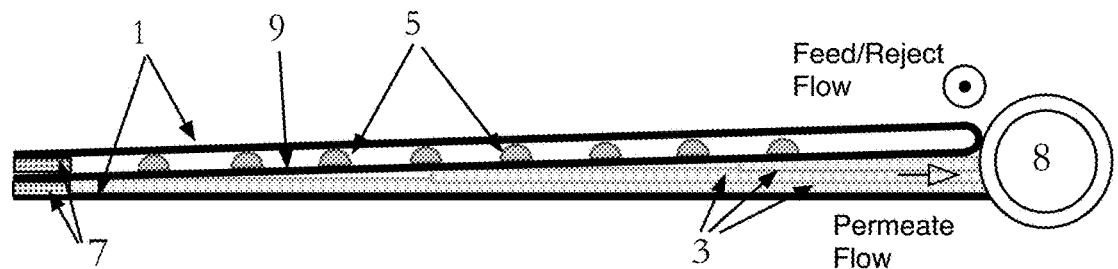
FIG. 6 is a longitudinal cross section illustration of an unrolled axial flow element with deposited fixed height feed spacer and a height graded mesh permeate carrier.

In an example embodiment shown in FIG. 6, an axial flow element employs a deposited fixed height feed spacer 5 between membrane sheets 1, 9 with a height graded mesh permeate carrier 3, created from three separate sheets of thin mesh, which increases in height from the end most distant from the center tube to the attachment to the center tube 8, bounded by glue lines 7. Permeate flows longitudinally inward towards the center tube while feed-to-reject flows axially, parallel to the axis of center tube 8.

Figure 7:
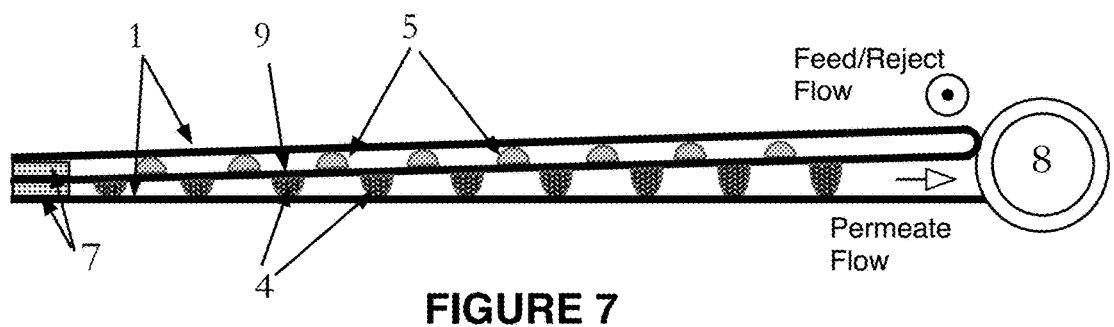
FIG. 7 is a longitudinal cross section illustration of an unrolled axial flow element with deposited fixed height feed spacer and a height graded deposited permeate carrier.

In another example axial flow embodiment, FIG. 7 shows a longitudinal cross section illustration of an unrolled axial flow element with deposited fixed height feed spacer 5 between membrane sheets 1, 9 with a height graded deposited permeate carrier 4 which increases in height from the end most distant from the center tube to the attachment to the center tube 8, bounded by glue lines 7. Permeate flows longitudinally inward towards the center tube while feed-to-reject flows axially, parallel to the axis of center tube 8.

Figure 8:
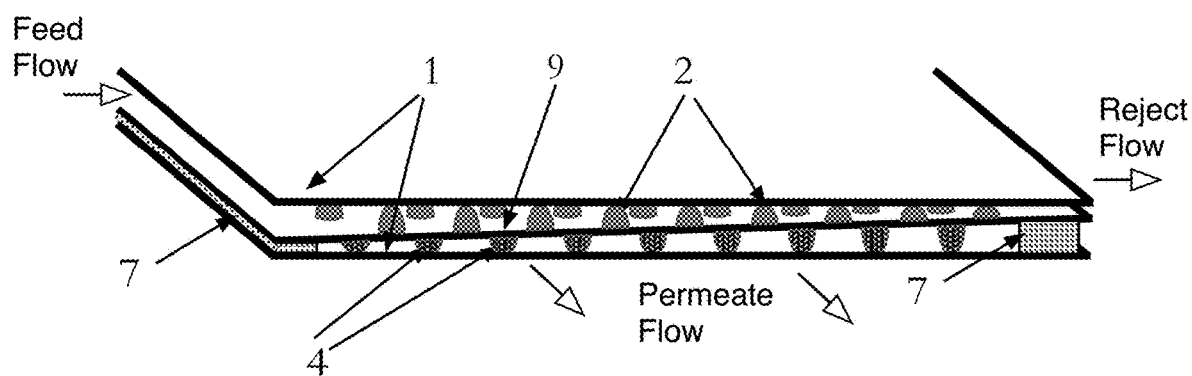
FIG. 8 is a longitudinal cross section illustration of an unrolled axial flow element with deposited height graded feed spacer and a height graded deposited permeate carrier.

In another embodiment, the height of the brine feed spacer is decreased from the brine feed inlet to its outlet in an axial flow element. This configuration allows for more consistent or increased brine flow velocity as the volumetric flow through the feed to reject stream is reduced due to flow across the membrane. Maintaining more constant axial volumetric flow throughout the feed space can be advantageous in preventing scale formation in an axial flow element. In this case, the height of the permeate carrier must be decreased commensurately so that the overall thickness of the feed spacer, membrane sheet, and permeate carrier are a constant thickness throughout the assembly to allow for uniform rolling. The variable height of both of these spacers can be achieved, as examples, by layering conventionally utilized mesh spacers of various heights or by depositing features on the membrane sheet whose height varies spirally directly onto one or both sides of the membrane sheet before element assembly. FIG. 8 depicts such an embodiment with a section of an axial flow element with deposited variable height feed spacer 2 which decreases in height from feed to reject flow between membrane sheets 1, 9 with a height graded deposited permeate carrier 4 which increases in height in the direction from feed to reject flow, bounded by glue lines 7.

Some permeable membrane systems use flat sheets instead of spiral-wound configurations and it can be seen that using graded height feed spacers, decreasing in height from inlet to outlet, in conjunction with inversely graded permeate spacers, can optimize volumetric flow in such systems as well. The example embodiments described, left in their unrolled states as illustrated in FIG. 2-FIG. 8, illustrate use in flat sheet systems.

Those skilled in the art will recognize that the present invention can be manifested in a variety of forms other than the specific example embodiments described and contemplated herein. Accordingly, departures in form and detail can be made without departing from the scope and spirit of the present invention as described in the appended claims.

We claim:

1. An element for use in fluid filtration, comprising:
   (a) a permeate spacer element, permeable to a fluid;
   (b) a membrane sheet disposed next to a first surface of the permeate spacer element;
   (c) a permeable sheet, permeable to a fluid, disposed next to a second surface, opposite the first surface, of the permeate spacer element; and
   (d) a feed-reject spacer element mounted on a surface of the membrane sheet and separated from the permeate spacer element by the membrane sheet, or mounted on the permeable sheet and separated from the permeate spacer element by the permeable sheet;
   (e) wherein, the permeate spacer element, permeable sheet, membrane sheet, and feed-reject spacer element are rolled around a central collection tube into a spiral wound element, and the permeate spacer element provides a permeate volume between the permeable sheet and the membrane sheet, and the feed-reject spacer element provides a feed-reject volume between the permeable sheet and the membrane sheet;
   (f) wherein the central collection tube defines an interior volume that is divided into a tube permeate volume and a tube reject volume, wherein the tube permeate volume is in communication with the exterior of the tube through one or more permeate openings, and the feed-reject volume is in communication with the exterior of the tube through one or more reject openings;
   (g) wherein the feed-reject spacer element provides a separation that decreases from a first separation distal from the reject openings to a second separation, lesser than the first separation, proximal to the reject openings;
   (h) wherein the permeate spacer element provides a separation that decreases from a first separation proximal the permeate openings to a second separation, lesser than the first separation, distal from the permeate openings.

2. An element as in claim 1, wherein the permeate carrier layer comprises an extruded or woven mesh with a varying thickness.

3. An element as in claim 1, wherein the permeate carrier layer comprises two or more layers of extruded mesh, woven mesh, or porous material, stacked to provide the varying thickness.

4. An element as in claim 1, wherein the permeate carrier layer comprises features deposited on the surface of the membrane sheet facing the permeate volume, or the surface of the permeable sheet facing the permeate volume, or both, where the features project from the surface on which they are deposited by a height that increases from a first height distal from permeate openings to a second height, greater than the first height, proximal to the permeate openings.

5. An element as in claim 1, wherein the feed-reject spacer element comprises an extruded or woven mesh with a varying thickness.

6. An element as in claim 1, wherein the feed-reject spacer element comprises two or more layers of extruded mesh, woven mesh, or porous material, stacked to provide the varying thickness.

7. An element as in claim 1, wherein the feed-reject spacer element comprises features deposited on the surface of the permeable sheet facing the feed-reject volume, or the surface of the membrane sheet facing the feed-reject volume, or both, where the features project from the surface on which they are deposited by a height that decreases from a first height distal from the reject openings to a second height, lesser than the first height, proximal to the reject openings.

* * * * *